United States Patent [19]

Chandler et al.

[11] Patent Number: 4,905,164
[45] Date of Patent: Feb. 27, 1990

[54] METHOD FOR MODULATING COLOR FOR EFFECTING COLOR CELL TEXTURE

[75] Inventors: Jimmy E. Chandler, Holly Hill; Richard G. Fadden, Ormond Beach, both of Fla.

[73] Assignee: General Electric Company, Syracuse, N.Y.

[21] Appl. No.: 943,690

[22] Filed: Dec. 19, 1986

[51] Int. Cl.⁴ .............................................. G09G 1/16
[52] U.S. Cl. ..................................... 364/518; 364/521
[58] Field of Search ................... 364/518, 521; 434/43; 358/75, 76, 80

[56] References Cited

U.S. PATENT DOCUMENTS

| | | | |
|---|---|---|---|
| 4,654,722 | 3/1987 | Alkofer | 358/80 X |
| 4,677,465 | 6/1987 | Alkofer | 358/80 |
| 4,727,365 | 2/1988 | Bunker et al. | 340/728 |
| 4,727,434 | 2/1988 | Kawamura | 358/80 X |
| 4,729,016 | 3/1988 | Alkofer | 358/80 |
| 4,731,671 | 3/1988 | Alkofer | 358/75 X |
| 4,745,465 | 5/1988 | Kwon | 358/75 X |
| 4,751,535 | 6/1988 | Myers | 358/80 X |
| 4,758,885 | 7/1988 | Sasaki et al. | 358/75 X |

OTHER PUBLICATIONS

"Color Image Quantization for Frame Buffer Display", Paul Heckbert, *Computer Graphics*, vol. 16, No. 3, (Jul. 1982).

*Primary Examiner*—Gary V. Harkcom
*Assistant Examiner*—Mark K. Zimmerman
*Attorney, Agent, or Firm*—Stephen A. Young; Paul Checkovich

[57] ABSTRACT

A full color real time cell texture generator uses a tapered quantization scheme for establishing a small set of colors representative of all colors of a source image. A source image to be displayed is quantitized by selecting the color of the small set nearest the color of the source image for each cell of the source image. Nearness is measured as Euclidian distance in a three-space coordinate system of the primary colors: red, green and blue. In a specific embodiment, an 8-bit modulation code is used to control each of the red, green, blue and translucency content of each display pixel, thereby permitting independent modulation for each of the colors forming the display image.

12 Claims, 4 Drawing Sheets

METHOD FOR MODULATING COLOR FOR EFFECTING COLOR CELL TEXTURE

This application is related in subject matter to copending application U.S. Ser. No. 527,809 filed Aug. 30, 1983, now U.S. Pat. No. 4,727,365 by Bunker et al, entitled "Advanced Video Object Generator", assigned to the instant assignee and incorporated herein by reference.

BACKGROUND OF THE INVENTION

The present invention relates generally to computer image generation systems and, more particularly, to a method for real-time color modulating display pixels for cell texturing.

One application for real-time computer image generation has been for visual training simulators that present scenes to an operator or trainee for practicing a task, such as piloting an airplane. In a visual training simulator, a three-dimensional model of the desired gaming area is prepared and stored on magnetic disk or other bulk storage medium. This model is designated the visual data base. A visual simulator combines an image generator with an electro-optical display system, such as a cathode ray tube (CRT) or similar display. The image generator receives three-dimensional data from the storage medium and transforms these data into corresponding perspective compensated two dimensional scene descriptions for display. The displayed image is representative of the scene that the operator would see if the operator were actually performing the task being simulated. Generation of the display images is said to be in "real time", which is normally taken to mean 30 frames per second, as in the U.S. television standard. Computer image generation systems are described in a book entitled *Computer Image Generation,* edited by Bruce J. Schacter and published by Wiley-Interscience (1983).

One known system is described in U.S. Pat. No. 4,343,037 to Bolton. According to the Bolton patent, a texture pattern is stored in memory and retrieved for each pixel along each scan line. (A plurality of scan lines form a frame. In a rectangular raster scan used by the U.S. television industry, 525 scan lines constitute one complete frame.) However, due to practical memory size limitations and to access times required for retrieving stored data from memory, the level of detail (LOD) which can be handled in real time by the Bolton system is limited. For depicting images of complex objects, such as trees, the number of edges and texture patterns required to generate a realistic or suitable image is considered to be prohibitively large for achieving feasible real time response in a system configured in accordance with the teachings of the Bolton patent.

Cell Texture image modulation described in the Bunker et al application uses monochrome modulation of an existing data base face color that is combined with face translucency information. That is, the cell texture processing for each cell is controlled by the intensity of a composite color assigned to and corresponding translucency of a face. True full color cell texture modulation could be produced by sequentially processing three faces, each face being assigned one of the triad of primary colors (i.e. red, green, blue; hereinafter "RGB"), with appropriate intensity and translucency obtained from the texture map for each cell. However, this approach would be very inefficient. Such processing would consume a large portion of available real time image processing capability. Furthermore, a straightforward modification to add true full color cell modulation to the configuration of Bunker et al would require a substantial increase in cell texture hardware.

While some previous systems have permitted simultaneous but equal modulation of all RGB components of a pixel (i.e., monochrome modulation), it was not practical prior to the present invention to have individualized independent true full color modulation of each of the respective RGB components for cell texturing in a real time image generation system. True full color modulation as used herein may be described as the ability to control the RGB components by independently modulating the RGB components using a single texture code so that a realistic color image may be displayed on a single face.

It is therefore an object of the present invention to provide real-time computer image generation with true full color cell texture modulation.

It is another object of the invention to provide a real time video image generator with true full color cell texture modulation while minimizing hardware requirements.

SUMMARY OF THE INVENTION

In accordance with the present invention, a method for color modulating pixels for cell texturing comprises assigning a color quantum from a pre-identified set of color quanta to each one of a plurality of cells corresponding to predetermined portions of a source image, determining a weighted average value for a pixel to be displayed in response to the respective quantum assigned and respective location with respect to the center of the pixel for cells about the pixel whose centers define the vertices of a polygon containing the center of the pixel, and providing the weighted average value for controlling the color intensity of the pixel. The number of color quanta of the set of quanta is less than the number of actual colors of the source image.

The color quantum from the set of quanta that is assigned to a cell is the color quantum nearest the actual color of the cell. Nearness is measured as Euclidian distance in a three-space coordinate system of the primary colors: Red, green and blue with black at the origin. A tapered quantization scheme may be used for determining the members of the set of color quanta that is representative of all colors of the source image. In a specific embodiment, an 8-bit modulation code is used for controlling each of the red, green, blue and translucency content of each display pixel, thereby permitting independent modulation for each of the colors forming the display image to achieve true full color modulation.

BRIEF DESCRIPTION OF THE DRAWING

The foregoing and other objects, aspects and advantages of the present invention will be better understood from the following detailed description of the presently preferred embodiment of the invention with reference to the accompanying drawing, in which.

DETAILED DESCRIPTION

A brief review of cell texturing as described in the above referenced Bunker et al application is provided here to place the present invention in an operational environment.

Generally, any point on a defined surface in three dimensional space can be specified by the values of two parameters. On a planar surface, these parameters are labeled X,Y corresponding to cartesian coordinates; on a cylindrical surface, they are labeled $r, Z, \theta$ corresponding to cylindrical coordinates; and on a spherical surface, they are labeled $r, \theta, \phi$, corresponding to spherical coordinates. In the following discussion, $Q_1$ and $Q_2$ are used as generic parameter designations. Base color or modulation information can be considered as functions of $Q_1$ and $Q_2$.

In one mode of operation, the value of $Q_1$ and $Q_2$ corresponding to the center of a pixel are determined. The modulation or color information designated by this $Q_1$, $Q_2$ is extracted from a cell data memory having previously been provided with the modulation or color information for each face of a set of objects to be shown on a video display, and the value of $Q_1$ and $Q_2$ is used to determine or modify the display pixel video. The initial contents of the memory can be determined by an algorithm applied to the $Q_1$, $Q_2$ values on the image of an object, by quantizing photographs (which may themselves have been previously digitized) of features of regions of the object to be represented, or by a combination of these schemes. The results of these image describing techniques are stored in the cell data memory for retrieval during processing for computer image generation. The treatment of object images in this way for computer image generation is called cell texturing.

The mathematics for determining the strike-point of a view ray from a view point to a parametrically defined curved surface is sufficiently complex so that typically a large amount of hardware, which may include a vector processor, is required to apply cell texture to such surfaces in real time systems. The vector processor performs computations for mapping video information from cells into display pixels of the scene to be displayed. As used herein, a cell refers to the minimum characterized portion of a source image having a predetermined color and a pixel refers to a "picture element", which is the minimum display unit. An example of a pixel is a raster dot in TV, wherein there are approximately 500 raster dots per horizontal scan line.

Figure 1A:
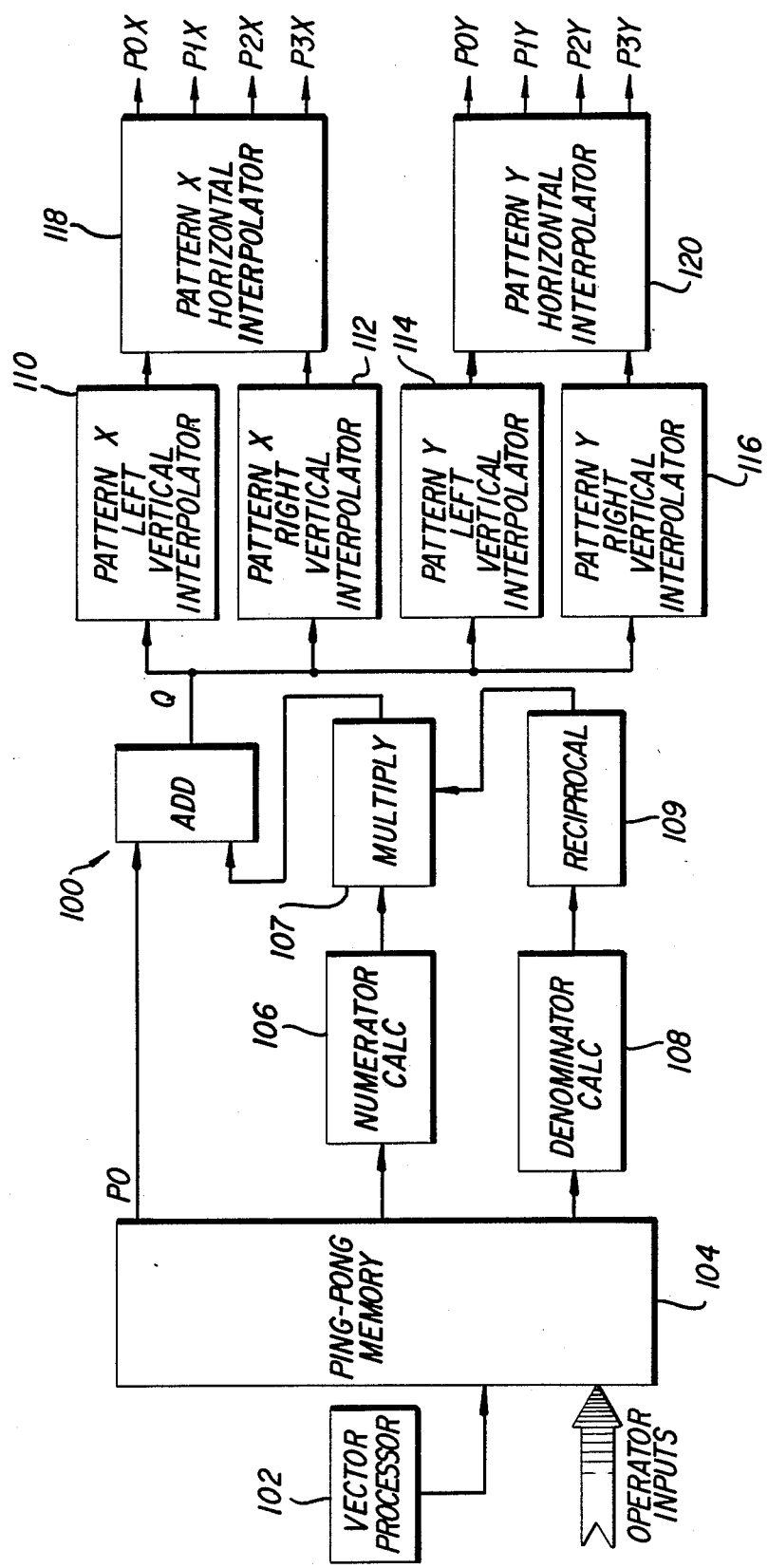
FIGS. 1A and 1B, taken together, are a functional block diagram illustrating a video object generator according to Bunker et al in conjunction with which the present invention may be used.
Figure 1B:
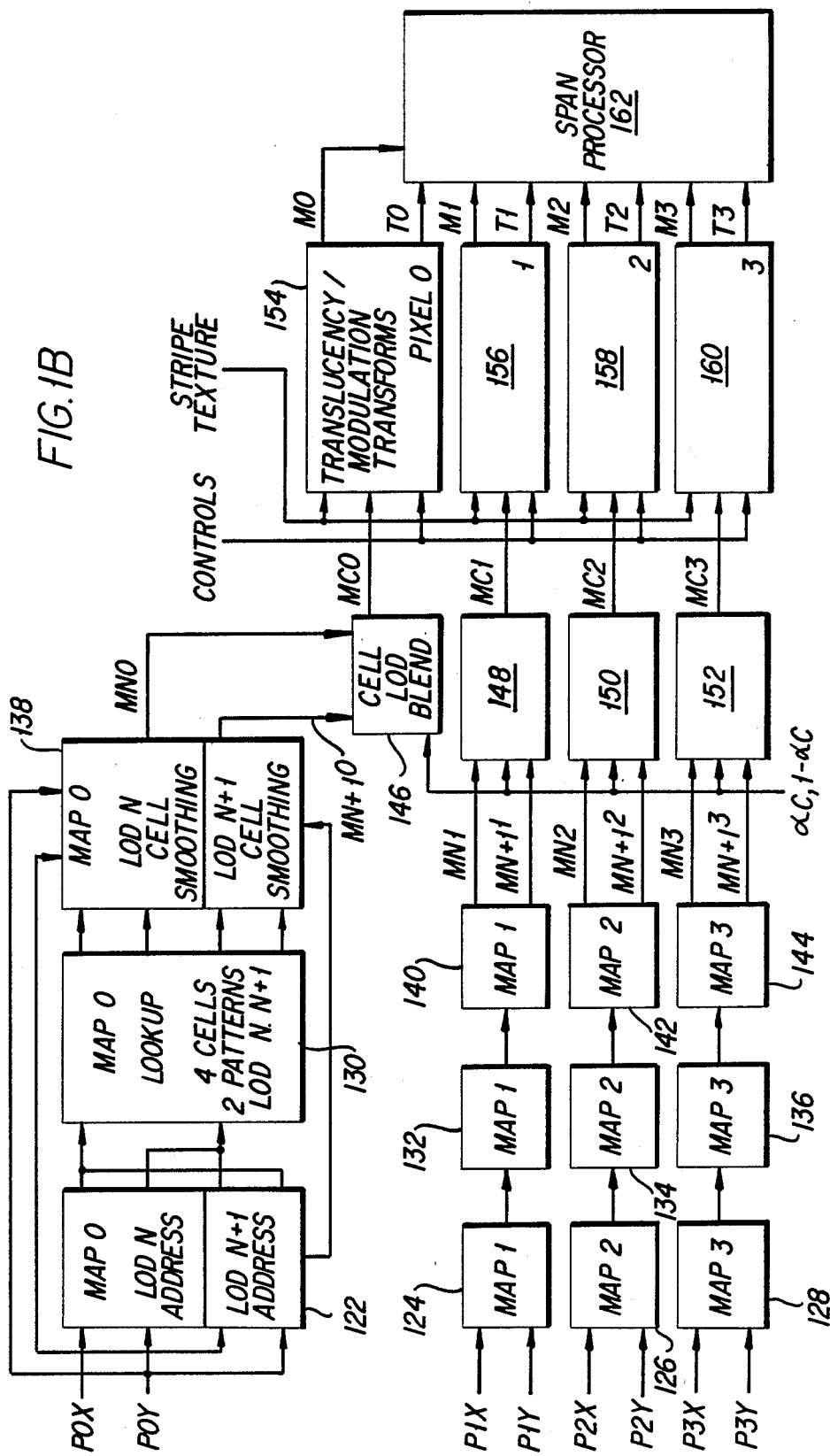

Referring now to the drawing, and more particularly to FIGS. 1A and 1B, there is shown in block diagram form a video generator as disclosed in the above referenced Bunker et al application. Source image data are input from vector processor 102, and operator inputs are provided from user controls (not shown) to input memory 104. The source image data contain color and texture information for each object face in the scene to be displayed. Memory 104 is double buffered in the digital data base so that the data for one field may be read out while the data for another are being loaded. Input memory 104 is configured with sufficient depth to hold all face data which may appear in one channel of a predetermined field. Conventional vector calculations which transform the pattern coefficients of the faces in a scene to three dimensional perspective from the observer's view point are performed by vector processor 102. The view point and operator control inputs are used to determine which object images are to be processed for display.

Bilinear interpolation is performed by the combination of vertical interpolators 110, 112, 114, and 116 and horizontal interpolators 118 and 120. Outputs from the horizontal interpolators are applied to cell map address generators 122, 124, 126, and 128, which calculate map addresses for accessing cell texture maps 130, 132, 134, and 136. Cell texture maps 130, 132, 134 and 136 contain cell texture data for each cell of the source image. Respective X and Y Q values are combined to form the map address for each of the four contiguous cells whose centers define the vertices of a polygon containing the image of the center of a pixel to be displayed. The LOD of the maps is used to control the map cell size relative to the size of the pixel to be displayed regardless of the distance along a view ray from the view point to the scene feature to be displayed. Each coarser LOD map may be generated by filtering a more detailed map into a quarter size smaller map. Thus, a 256×256 map becomes 128×128 and then a 64×64 and so forth as view distance from the view point to the feature increases.

LOD cell memories 130, 132, 134, and 136 store the different LOD versions of the maps. The map storage is arranged so that the N and N+1 LOD map versions, wherein N+1 designates the next coarser LOD map, are available simultaneously to accomplish a smooth transition between the LOD's. The determination of which LOD map to use is made by monitoring both the X and Y pattern gradients in the view plane. This is controlled by floating point subtraction hardware in the base number calculator comprising components 106 to 109.

Outputs from cell memories 130, 132, 134, and 136 are supplied to respective cell smoothing components represented by blocks 38, 140, 142, and 144. The cell smoothing blocks also receive inputs from horizontal interpolators 118 and 120 which are used to calculate the proportion of intensity input from each of the four contiguous cells whose centers define a polygon surrounding the center of the pixel to be displayed for each of the cell intensities for ultimately controlling pixel intensity. After cell smoothing at each LOD, the resulting modulations from each LOD are blended together in circuitry represented by blocks 146, 148, 150, and 152. The cell texture value obtained from the blending operation is used for controlling face translucency and for modulating face color in translucency/modulation circuitry represented by blocks 154, 156, 158 and 160. The outputs from the translucency/modulation circuits 154, 156, 158 and 160 are provided to span processor 162 for controlling the texture of the image to be displayed.

Figure 2:
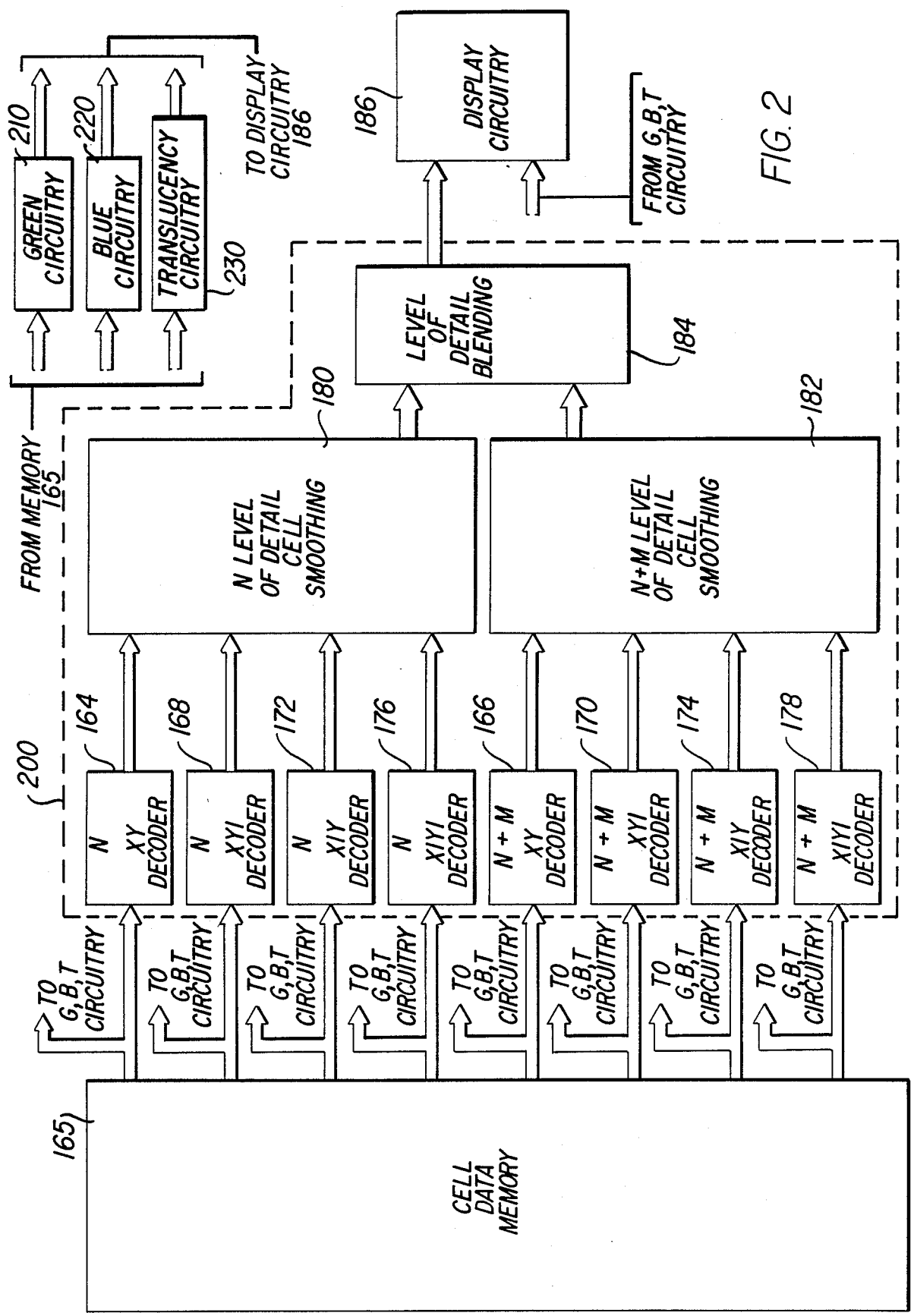
FIG. 2 is a block diagram of a cell texture generator according to the present invention.

FIG. 2 is a block diagram of a cell texture generator in accordance with the present invention. Although only a portion of the cell texture generator circuitry (i.e. red color components 200) for processing data along pixel computation paths is shown in detail in order to avoid undue repetition, it is to be understood that similar circuitry 210, 220 and 230 may be used for generating each of the green, blue and translucency outputs of the cell texture generator, respectively. Analogous red, green, blue and translucency circuitry may also be used for providing texture modulation for each parallel pixel processing path that a real time image generation system may require. Since translucency data are processed analogously to color data, hereinafter reference to color may also be taken to apply to translucency unless otherwise noted.

Decoders 164, 166, 168, 170, 172, 174, 176 and 178 (hereinafter "decoders 164 to 178") have respective inputs coupled to a cell data memory 165 for receiving a parallelly formatted color code. For the embodiment shown, four contiguous cells, having addresses represented by respective coordinate pairs X,Y; X,Y+1; X+1,Y and X+1,Y+1, at two levels of detail (N and N+M) surrounding an image of a pixel center are processed. Each decoder determines red color data from the corresponding N LOD or N+M LOD color code supplied thereto. The N LOD and N+M LOD color codes are also supplied to corresponding decoder components of the green, blue and translucency (GBT) circuitry, respectively. Decoders 164, 168, 172 and 176 receive the respective N LOD color codes and decoders 166, 170, 174 and 178 receive the respective N+M LOD color codes. Each decoder N and N+1 LOD group 164 and 166, 168 and 170, 172 and 174, and 176 and 178, for a respective cell extracts red color information from the color code for one of the four contiguous cells whose centers define the vertices of a polygon enclosing the center of the pixel along the path being calculated.

Each decoder 164 to 178 comprises means for obtaining color information from the cell color code supplied thereto from cell data memory 165. Means for obtaining color information may include a table look-up, a PROM, a translator memory, a combination thereof or other similar device for providing a predetermined color indicator in response to the color code supplied thereto. Sufficient depth is allocated to decoders 164 to 178 to provide each different LOD cell texture map with its own set of color indicators so that the process of color information extraction from a coded input can be executed in parallel for each of decoders 164 to 178.

. In order to reduce word lengths representative of color for decreasing memory size requirements in order to minimize cost and to increase speed of computation and flexibility of texture rendition, the entire color spectrum is represented by a set of predetermined quanta, or modulation values, of color. A general objective of color spectrum quantization is to select a relatively small number of members or color quanta forming a set of color quanta such that a predetermined one of the members of the set may be used to represent each of the colors of the original or source image that is to be displayed, while maintaining a perceived pleasing and accurate rendition of the source image in the image that is ultimately displayed. Attempts to use uniformly distributed color quanta have resulted in significant noticeable differences, such as contouring, between source images and the corresponding displayed images formed from the uniformly distributed quanta of color. Disadvantages of using a set of color quanta, such as a compressed 8-bit code, to represent the entire color spectrum may be eliminated by employing a pyramidal or tapered filtering color quantization scheme to select the members of the set of color quanta in accordance with the present invention. A particular tapered quantization technique that is employed in a presently preferred embodiment of the present invention is similar to the Median Cut method described in "Color Image Quantization For Frame Buffer Display" Paul Heckbert, *Computer Graphics*, Vol. 16, No. 3 (July 1982).

In a tapered quantization approach, a predetermined set of color quanta, the number of color quanta being substantially less than all possible colors and representative of all colors in a source image (presented as separate modulation values of red, green and blue), which is used to quantize the colors of the source image, is ultimately established. After the members of the set of color quanta are determined, the colors of the source image may be mapped or quantized by selecting the color quantum from the set of quanta nearest the color of each cell of the source image. Nearness is measured as Euclidian distance in a three space RGB coordinate system. This is, each axis of a three orthogonal axis system represents a monotonically changing color intensity from the origin of the system of a respective RGB color. Colors that are not a pure rendition of one of the axial colors are assigned a position in the three axis system representative of a combination of intensities of each of the red, green and blue primary colors. Each member of the set of color quanta may be assigned an identification number, or color code, and for each cell of the source image, the identification number of the closest color is stored in a predetermined location of cell data memory 165. For example, if 64 (i.e. $2^6$) different colors form the set of color quanta representative of all colors in the source image and 2 bits are allocated to translucency, then the color of each cell of the source image can be represented by a respective 8-bit code in accordance with the present invention.

Decoders 164 to 178 are arranged to receive the respective cell color code from memory 165 and to make available a red modulation index indicative of the actual modulation to be applied to the red color circuitry of the display circuitry 186.

If instead of an 8-bit code, an 8-bit word were to be used for each of the red, green and blue color components of a source image, then approximately 17 million (i.e. $2^{24}$) different colors would be possible. Further, if an additional 8-bit word were assigned to represent translucency then over 4 billion (i.e. $2^{32}$) different combinations of color and translucency could be designated. In addition, substantial memory would be required to store the 32 bits of information for each cell of the source image.

Figure 3:
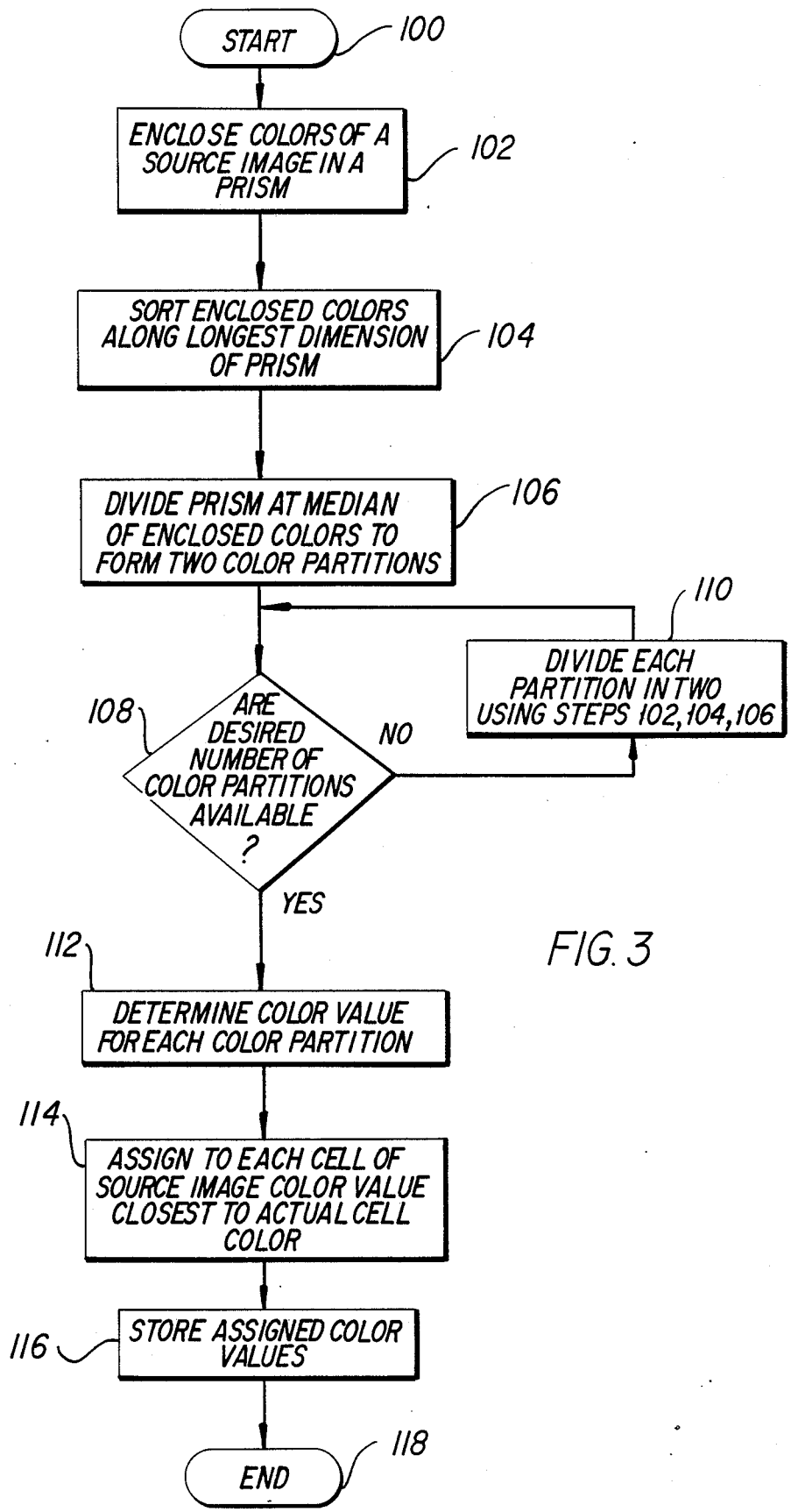
FIG. 3 is a flow diagram of a representative tapered quantization scheme in accordance with the present invention.

Referring to FIG. 3, a flow chart of a program for creating a predetermined set of color quanta is shown. The spatial relationship described between colors are with reference to an RGB 3-dimensional color system. All colors in the source image are represented as points in the color three-space, with black at the origin and pure red, green and blue along a respective axis.

The program starts at step 100 and execution of step 102 tightly encloses the colors of a source image in a rectangular prism, so that at least one color point lies in each surface of the prism. Performing step 104 sorts the enclosed colors along the longest axis or dimension of the prism and execution of step 106 divides the prism at the median of the enclosed colors and perpendicular to the longest dimension to form a pair of color partitions. Generally a predetermined number of color partitions, each of which is representative of a color modulation value, for quantizing the source image is desirable. For convenience and because of satisfactory results obtained from perceptive tests when source images were quantized and then displayed in accordance with the present invention, a set of 64 different colors, which may be represented by a 6-bit code was used. Step 108 tests whether the desired number, i.e. 64, of color partitions are available. If the desired number of color partitions are not available then the program proceeds to perform step 110 which divides each of the existing color partitions in two by repeating steps 102, 104 and 106 on each partition. Execution of step 108 is then repeated.

If the desired number of color partitions is available when step 108 is executed, then the program performs step 112 to determine a color value for each color partition. The color value, or color quantum, for a color partition is the color value of the center of the color partition. The group of color values for each of the color partitions constitutes the set of color quanta which is used to quantize the source image. Execution of step 114 assigns a color value from the set of color values to each cell of the source image, wherein the color value assigned is the color value closest to the actual color of the cell of the source image. Execution of step 116 stores the assigned color values for the source image cells in cell data memory 165 (FIG. 2) so that they may be retrieved during processing for visual image generation.

In operation, a source image is quantized by assigning a color quantum from a pre-identified set of color quanta to each cell of the source image. The assigned color quantum is stored in cell data memory 165 (FIG. 2). The set of color quanta is representative of the actual color of the source image and the color quantum assigned to a cell is the color quantum from the set of color quanta representing the color closest to the actual color of the portion of the source image corresponding to the cell. The set of color quanta may be determined in accordance with the procedure described with reference to FIG. 3.

The color code for each of the four contiguous cells, whose centers define a polygon including the image of the center of a pixel to be displayed, is supplied from cell data memory 165 to respective decoders 164, 168, 172 and 176 for N LOD processing and to corresponding respective decoders 166, 170, 174 and 178 for N+M LOD processing. During processing, each of decoders 164 to 178 receives the color code for the respective cell of the source image and supplies a true color signal, or color modulation index, at respective outputs, which are connected to appropriate inputs of N LOD cell smoothing circuitry 180 and N+M LOD cell smoothing circuitry 182. Although the same color code is also supplied to corresponding respective circuitry for G, B and T, the respective decoding circuitry for G, B and T is predeterminedly configured for receiving the color code and supplying a corresponding true color signal, or color modulation index, for its respectively designated primary color. Thus, for each color quantum of the set of color quanta, a unique combination of red, green, blue and translucency color indices is obtained, whereby independent control of the color intensity of each of the red, green and blue components of a display pixel may be provided.

For example, if each of decoders 164 to 178 includes a respective look-up table, and an 8-bit color code (six least significant bits for color and two most significant bits for translucency) is used, then 64 unique colors, each having one of four degrees of translucency may be obtained. The look-up table may be arranged so that numbers 0–63 represent each of the 64 colors at translucency $T_o$ (say 0%, i.e. opaque), numbers 64–127 represent each of the 64 colors at translucency $T_1$ (say 25%), numbers 128–191 represent each of the 64 colors at translucency $T_2$ (say 75%) and numbers 192–255 represent each of the 64 colors at translucency $T_3$ (say 100%, i.e. transparent), wherein for each group of sixty-four colors the colors are presented in the same order. That is, numbers 0, 64, 128 and 192 represent one color, numbers 1, 65, 129 and 93 represent another color, and so forth. Of course the translucency values may be predeterminedly selected as appropriate to presenting a desired display. N LOD cell smoothing circuitry 180 determines a weighted average value of color intensity for a pixel to be displayed in response to the respective quantum of color assigned to the cells through the respective color index provided thereto and the location of the cells with respect to the center of the pixel to be displayed. N+M LOD cell smoothing circuitry 182 determines a similar weighted average value of color intensity from the N+M LOD cell information provided thereto. The weighted average values from N LOD and N+M LOD cell smoothing circuitry 180 and 182, respectively, are supplied to LOD blending circuitry 184, which predeterminedly combines the N LOD weighted average with the N+M LOD weighted average and supplies a signal indicative of the result to display circuitry 186, which also receives output signals from the G, B and T circuitry, for color modulating pixels to be displayed for effecting true full color cell texturing. Thus, multiple colors may be displayed on a single face without resort to approximation or other techniques, wherein a realistic image is not always presented.

From the foregoing, it will be appreciated that a unique and practical way for obtaining real time, true full color modulation for cell texturing in a visual image generating system has been illustrated and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. In a visual image generating system for generating visual images from stored data by color intensity control of pixels forming an image, the visual images being formed from a plurality of cells corresponding to predetermined portions of a source image, each cell having a center and each source image having a predetermined number of actual colors, a method for color modulating pixels for cell texturing, comprising:

assigning a color quantum from a preidentified set of color quanta having a predetermined number of quanta to each one of the plurality of cells, wherein the set of color quanta is representative of the number of actual colors of the source image and further wherein the color quantum assigned to a cell is the color quantum from the set of color quanta representing the color closest to the color of the portion of the source image corresponding to the cell;

determining a weighted average value of color intensity for a pixel to be displayed in response to the respective quantum assigned to the cells about the image of the pixel to be displayed and the location of the center of cells about the image of the pixel to be displayed with respect to the center of the pixel to be displayed, wherein the centers of the cells about the image of the pixel to be displayed define verticals of the polygon containing the center of the pixel to be displayed; and providing the weighted average value for controlling the color intensity of the pixel to be displayed,
wherein the number of quanta of the set of quanta is less than the number of actual colors of the source image.

2. The method as in claim 1, wherein the step of assigning includes subjecting the source image to a tapered quantization scheme for identifying each of the color quanta of the preidentified set of color quanta.

3. The method as in claim 2, wherein the tapered quantization scheme employs a longest dimension cut algorithm.

4. The method as in claim 3, wherein the longest dimension cut algorithm includes:
representing colors of the source image as points in a three dimensional color system having predetermined intensities of a primary color along each axis, wherein the points are indicative of the combination of axial colors for forming the corresponding color of the source image;
enclosing the points in a rectangular prism;
sorting the enclosed points along the longest dimension of the prism, the sorted points having a median;
dividing the prism at the median of the sorted colors, thereby forming a pair of color partitions;
repeating the steps of enclosing, sorting and dividing until a predetermined number of partitions is established, each of the predetermined number of partitions having a respective center; and
determining a color quantum for each of the predetermined number of partitions, the color quanta determined forming the set of color quanta.

5. The method as in claim 4, wherein the step of determining a color quantum includes designating the center of each of the predetermined number of partitions as the color quantum for the respective partition.

6. The method as in claim 5, further including storing the color quantum for each of the predetermined number of partitions.

7. The method as in claim 1, wherein the step of providing further includes providing the weighted average value for independently controlling the color intensity of each of the red, green and blue components of the pixel to be displayed.

8. The method as in claim 7, wherein the step of assigning further includes assigning a code representative of the color quantum and the step of providing further includes providing the code to each of a red, green and blue color section.

9. In a visual image generating system for generating a visual image in real time by color intensity control of pixels forming the visual image, the visual image able to be derived from a source image having a plurality of cells, each cell having a predetermined color intensity value and a center, a method for true full color real time cell texture modulating the visual image, comprising the steps of:
subjecting the source image to a tapered quantization scheme for identifying a predetermined number of members of a small set of colors representative of all colors of the source image, wherein the number of members of the set of colors are less than all colors of the source image;
quantizing the source image by assigning a neatest color of the set to each cell of the source image;
and controlling the color intensity of each pixel of the visual image in response to the assigned nearest color for the cells surrounding a respective center of each pixel.

10. The method as in claim 9, wherein the color intensity of each pixel includes a green and blue component and further wherein the step of controlling includes independently controlling the color intensity of each of the red, green and blue components of each pixel.

11. The method as in claim 9, wherein the image of each pixel includes a respective center of each pixel and further wherein the centers of the cells surrounding the respective center of each pixel define vertices of a polygon containing the center of a respective one of each pixel.

12. The method as in claim 10, wherein the step of quantizing includes assigning a code representative of the nearest color of the set to each cell of the source image and the step of modulating further includes providing the code for controlling each of the red, green and blue color components.

* * * * *

UNITED STATES PATENT AND TRADEMARK OFFICE
CERTIFICATE OF CORRECTION

PATENT NO. : 4,905,164
DATED : 2/27/90
INVENTOR(S) : Jimmy E. Chandler, et al.

It is certified that error appears in the above-identified patent and that said Letters Patent is hereby corrected as shown below:

Column 8, Line 67, delete "verticals" and substitute --vertices-- therefor.

Column 10, Line 29, delete "green and blue" and substitute --red, green and blue-- therefor.

Signed and Sealed this

Nineteenth Day of May, 1992

Attest:

DOUGLAS B. COMER

*Attesting Officer*   Acting Commissioner of Patents and Trademarks